(12) United States Patent
Shi

(10) Patent No.: US 10,690,598 B2
(45) Date of Patent: Jun. 23, 2020

(54) AIR PIPE JOINT AND MEASUREMENT SYSTEM FOR SUBSTRATE INSPECTION

(71) Applicant: Wuhan China Star Optoelectronics Technology Co., Ltd., Wuhan, Hubei (CN)

(72) Inventor: Kai Shi, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/752,549

(22) PCT Filed: Jan. 24, 2018

(86) PCT No.: PCT/CN2018/074066
§ 371 (c)(1),
(2) Date: Nov. 16, 2018

(87) PCT Pub. No.: WO2019/127798
PCT Pub. Date: Jul. 4, 2019

(65) Prior Publication Data
US 2019/0383752 A1    Dec. 19, 2019

(30) Foreign Application Priority Data

Dec. 28, 2017   (CN) .......................... 2017 1 1463254

(51) Int. Cl.
*G01B 11/02* (2006.01)
*G01N 21/88* (2006.01)
(Continued)

(52) U.S. Cl.
CPC ....... *G01N 21/8806* (2013.01); *G01N 21/958* (2013.01); *G01N 2021/9513* (2013.01); *G01N 2201/062* (2013.01)

(58) Field of Classification Search
CPC ......... G01B 11/16; G01B 11/14; G01B 11/24; G01B 11/26; G01B 11/022;
(Continued)

(56) References Cited

U.S. PATENT DOCUMENTS

| 6,357,802 B1 * | 3/2002 | Nozato | ............... B29C 45/1676 285/340 |
| 2008/0192264 A1 * | 8/2008 | Heiden | ................ G01B 11/002 356/615 |

(Continued)

FOREIGN PATENT DOCUMENTS

| CN | 201153119 Y | 11/2008 |
| CN | 101819220 A | 9/2010 |

(Continued)

*Primary Examiner* — Mesfin T Asfaw
(74) *Attorney, Agent, or Firm* — Hemisphere Law, PLLC; Zhigang Ma

(57) ABSTRACT

This invention discloses an air pipe joint for inspecting a substrate, including a hollow pipe body and a light source. The pipe body comprises a first pipe body and a second pipe body which are bent to and communicated with each other. Free ends of the first pipe body and the second pipe body are respectively an air inlet end for connecting an air intake pipe and an air outlet end for discharging air. The light source is fixed inside the pipe body. The light emitted by the light source is emitted from the air outlet end. This invention further discloses a measurement system for substrate inspection. The air pipe joint can emit light from the air outlet end thereof, reduce a blind spot on the transparent stage and influence on measurement accuracy due to a blocking of the air pipe joint itself against the light source.

18 Claims, 3 Drawing Sheets

(51) Int. Cl.
*G01N 21/958* (2006.01)
*G01N 21/95* (2006.01)

(58) Field of Classification Search
CPC . G01B 11/0625; G01B 11/0675; G01B 11/00; G01B 11/03; G01B 11/2518; G01B 11/2755; G01B 15/02; G01B 2210/52; G01B 2210/56; G01B 2290/25; G01B 5/02; G01B 5/14; G01B 5/24; G01B 5/28; G01B 7/16; G01B 9/02; G01B 9/02015; G01B 9/02018; G01B 21/00; G01B 7/003; G01B 11/0608; G01B 7/107; G01B 7/30; G03F 7/0002; G03F 1/24; G03F 1/84; G03F 7/20; G03F 7/7015; G03F 7/7065

See application file for complete search history.

(56) References Cited

U.S. PATENT DOCUMENTS

| | | |
|---|---|---|
| 2009/0073718 A1 | 3/2009 | Chung |
| 2012/0320382 A1* | 12/2012 | Heiden ................ G01B 11/002 356/500 |

FOREIGN PATENT DOCUMENTS

| | | |
|---|---|---|
| CN | 202707560 U | 1/2013 |
| CN | 103489997 A | 1/2014 |
| CN | 104386491 A | 3/2015 |
| CN | 205067834 U | 3/2016 |
| CN | 206379342 U | 8/2017 |

* cited by examiner

AIR PIPE JOINT AND MEASUREMENT SYSTEM FOR SUBSTRATE INSPECTION

RELATED APPLICATIONS

The present application is a National Phase of International Application Number PCT/CN2018/074066, filed Jan. 24, 2018, and claims the priority of China Application No. 201711463254.7, filed Dec. 28, 2017.

FIELD OF THE DISCLOSURE

The disclosure relates to a field of display inspection technology, and in particular, to an air pipe joint and a measurement system for substrate inspection.

BACKGROUND

In the FPD (flat panel display) industry, a large number of testing equipment use glass stage as a platform for carrying glass substrates, such as CD (critical dimension) measuring equipment, total pitch (total spacing) measuring equipment, maintenance equipment, etc. They are designed to utilize a translucent property of the glass stage to provide a translucent illumination from location below the stage during measurement, so as to increase the contrast and clarity of the measured image and then get more accurate and stable measurement results.

Specifically, during a measurement a light source for translucent illumination is usually placed under the glass stage. After passing through the glass stage and the glass substrate, the light of the light source enters a measurement microscope and generates a measured image at a CCD (Charge-coupled Device).

However, this design is also flawed. In order to firmly fix the glass substrate during a measurement and to facilitate positioning of the substrate during transporting the substrate, a large number of vacuum suction and air blowing lines need to be provided on the glass stage. Joints of these lines are usually opaque resin or metal material. When the light source is moved to a position below the glass stage to irradiate the glass substrate, the light of the light source will not be able to pass through the glass stage due to the obstruction of the joint, thus forming a "blind spot" for lighting, and affecting the measurement.

SUMMARY

In view of the deficiencies of the prior art, the invention provides an air pipe joint and a measuring system for substrate inspection, which can avoid the air pipe joint blocking an illuminating light between the substrate and the light source during a measurement and can ensure a result of the measurement.

In order to achieve the above object, the present invention adopts the following technical solutions.

An air pipe joint for inspecting a substrate includes a hollow pipe body and a light source, wherein the pipe body comprises a first pipe body and a second pipe body which are bent to and communicated with each other, free ends of the first pipe body and the second pipe body are respectively an air inlet end for connecting an air intake pipe and an air outlet end for discharging air, the light source is fixed inside the pipe body, and the light emitted by the light source is emitted from the air outlet end.

As one of embodiments, the air pipe joint for substrate inspection further includes a reflection mirror, and the reflection mirror is disposed in the pipe body for reflecting the light emitted from the light source toward the air outlet end.

As one of embodiments, the light source is an LED light source.

As one of embodiments, a reflecting surface of the reflection mirror is a concave arc surface or an inclined plane.

As one of the embodiments, the reflection mirror is disposed at a corner portion where the first pipe body and the second pipe body are connected, and the reflecting surface faces both the air inlet end and the air outlet end. The light source is right opposite to the reflection mirror.

As one of embodiments, a through hole is formed at an intersection of the first pipe body and the second pipe body, a light emitting end of the light source is embedded in the through hole and faces the reflecting surface.

As one of embodiments, the light source includes a lamp bead, a heat sink, and a plurality of heat-dissipating fins. The heat sink is fixed on the tail of the lamp bead, and the heat-dissipating fins are disposed at the end of the heat sink with interval. The lamp bead is embedded in the through hole, and the heat-dissipating fins extend to outside of the pipe body.

As one of the embodiments, the air pipe joint for substrate inspection further includes a sealing ring. An inner surface of the first pipe body is provided with a circle of stopping part. The sealing ring elastically abuts on an inner wall of the first pipe body, and is located between the stopping part and the air inlet end.

As one of the embodiments, the air pipe joint for substrate inspection further includes a circle of elastic reed for making elastic contact with the air inlet pipe, and the elastic reed is fixed on the inner surface of the first pipe body and approaches the air inlet end.

Another object of the present invention is to provide a measurement system for substrate inspection, comprising a transparent stage for supporting a substrate, an illuminating light source disposed under the stage, a measuring device disposed above the stage and being opposite to the illuminating light source so as generate a measured image, and an air pipe joint for substrate inspection. The second pipe body penetrates into the bottom of the stage and fixed in the stage, and the air outlet end faces the measuring device.

The air pipe joint of the present invention has a light source in its interior, which can emit light from the air outlet end thereof. Therefore, the blind spot on the transparent stage can be reduced, and the influence on the measurement accuracy due to a blocking of the air pipe joint itself against the light source can be reduced.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

In order to understand the above objectives, features and advantages of the present disclosure more clearly, the present disclosure is described in detail below with references to the accompanying drawings and specific embodiments. It should be understood that the specific embodiments described herein are merely used to explain the present invention, and are not intended to limit the present invention.

Figure 1:
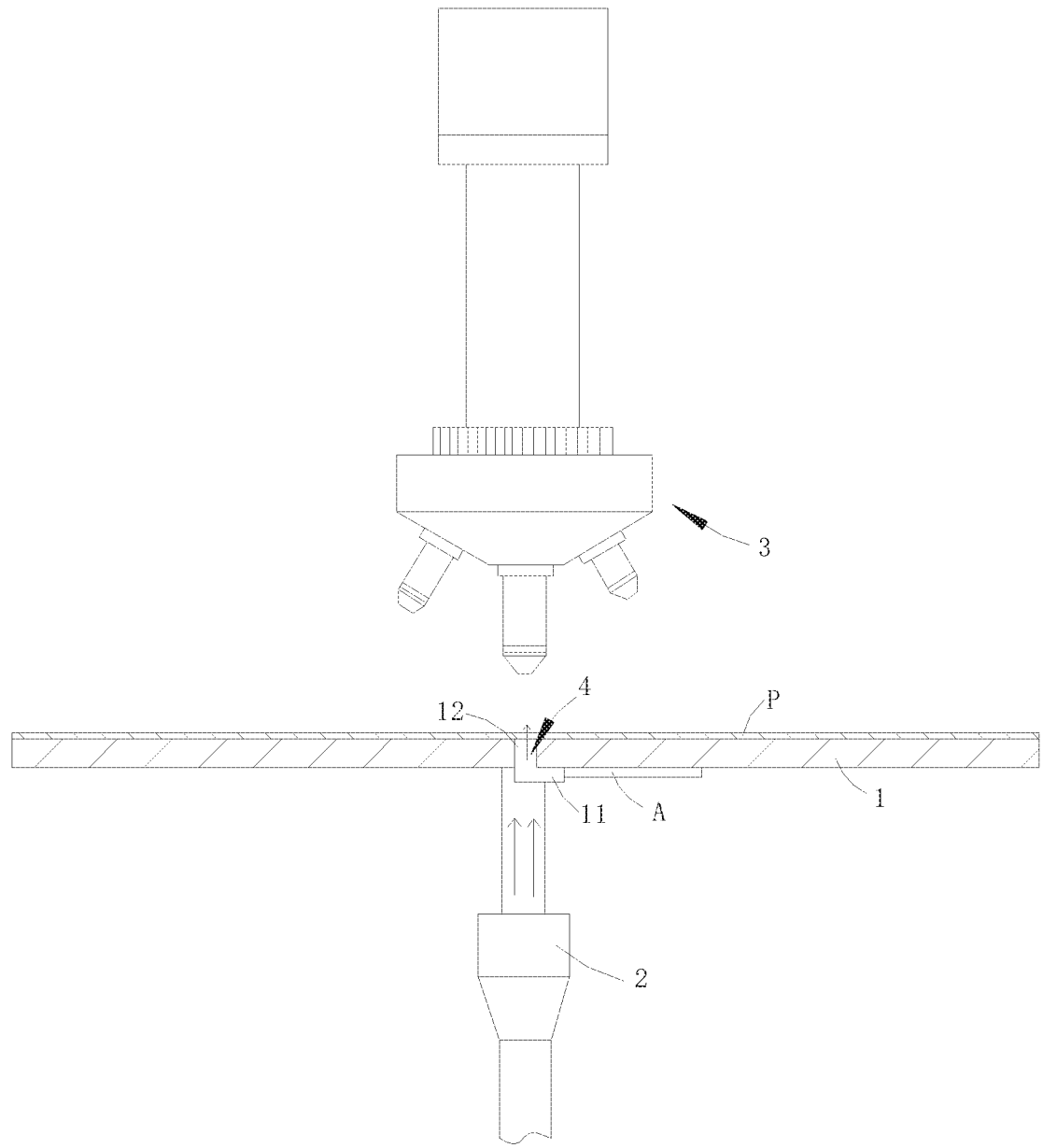
FIG. 1 is a schematic structural diagram of a measurement system according to one embodiment of the present invention.
Figure 2:
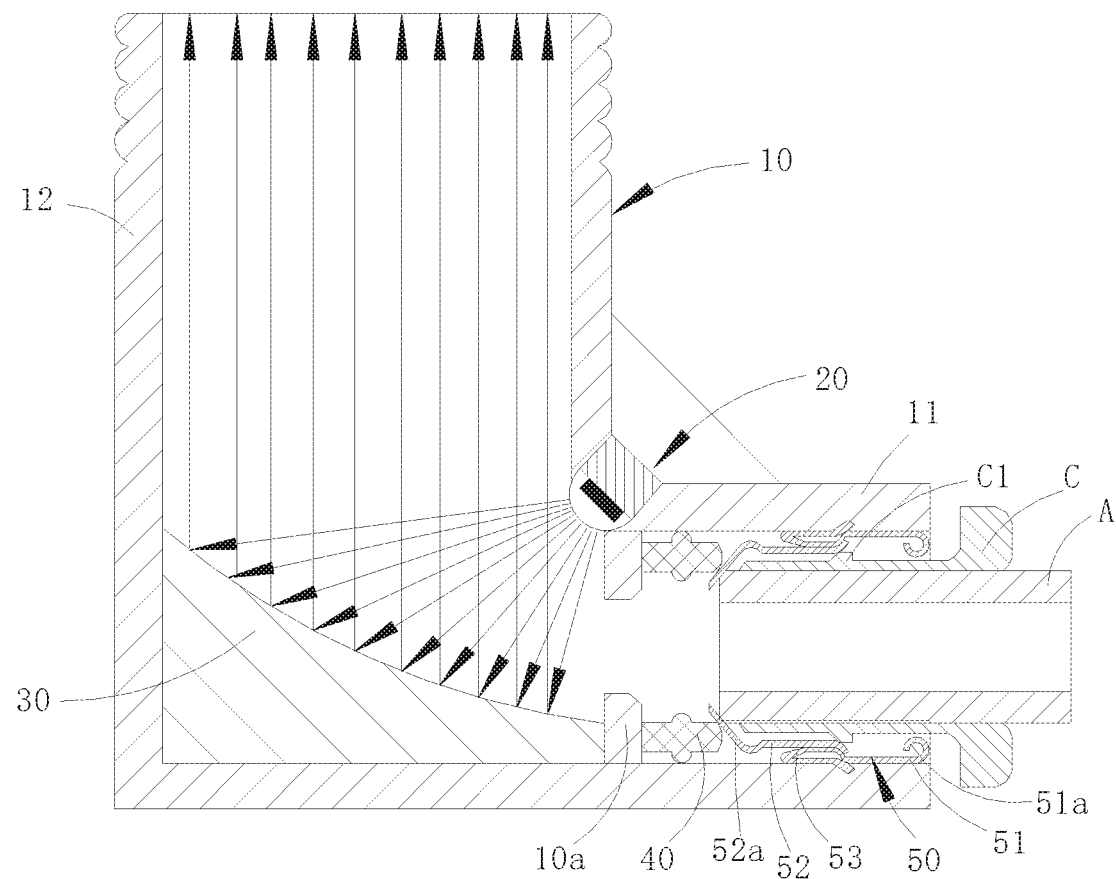
FIG. 2 is a schematic structural diagram of an internal structure of an air pipe joint according to one embodiment of the present invention.

Referring to FIG. 1, one embodiment of the present invention provides a measurement system for substrate inspection, comprising a transparent stage 1 for supporting a transparent substrate P, an illuminating light source 2 disposed under the stage 1, a measuring device disposed above the stage 1 and being opposite to the illuminating light source 2 so as to generate a measured image, and an air pipe joint 4. By means of incorporating with FIG. 2, the air pipe joint 4 includes a hollow pipe body 10 and a light source 20. The pipe body 10 includes a first pipe body 11 and a second pipe body 12 which are bent to and communicated with each other. Free ends of the first pipe body 11 and the second pipe of the body 12 are respectively an air inlet end for connecting an air intake pipe A and an air outlet end for discharging the air. The light source 20 is fixed inside the pipe body 10. The light emitted by the light source 20 is emitted from the air outlet end. The second pipe body 12 penetrates into the bottom of the stage 1 and fixed in the stage 1. The air outlet end faces the measuring device 3.

Preferably, the first pipe body 11 and the second pipe body 12 are perpendicular to each other. A through hole for installing the second pipe body 12 is provided in the transparent stage 1. The first pipe body 11 is attached to a lower surface of the stage 1. The second pipe 12 has a length same to the thickness of the stage 1. The second pipe 12 is nested into the through hole. The tip of the air outlet end of the second pipe 12 is at a plane same to the upper surface of the stage 1 and faces toward the measuring device 3 at its right top. When the transparent substrate P is inspected, the substrate P is closely placed on the stage 1, and be well adsorbed on the surface of the stage 1 by means of an external air suction device connected to the air intake pipe A, and thus is prevented from a shifting phenomenon during inspection. After the substrate P is fixed, the illuminating light source 2 under the stage 1 is turned on and the light source 20 is also turned on. Both of the light source 20 and the illuminating light source 2 irradiate the stage 1 simultaneously. The light source 20 can compensate for a part of the light blocked by the air pipe joint 4. After passing through the stage 1 and the substrate P, the light enters the measuring device 3 and generates a measured image in the image capturing device of the measuring device 3.

Specifically, a reflection mirror 30 is disposed inside the air pipe joint 4. The reflection mirror 30 is located in the pipe body 10 and can reflect the light emitted from the light source 20 toward the air outlet end. A reflecting surface of the reflection mirror 30 is a concave arc surface or inclined plane. The projection of a hollow portion of the second pipe 12 on the reflection mirror 30 falls on the reflecting surface of the reflection mirror 30. The focus of the reflection mirror 30 is inside the second pipe body 12 so as to ensure the light irradiating to the reflection mirror 30 can be maximally reflected from the end of the second pipe body 12, The reflection mirror 30 is disposed at a corner where the first pipe body 11 and the second pipe body 12 are connected together. The reflecting surface faces both the air inlet end and the air outlet end. The light source 20 selects a LED light source which has a relatively concentrated light, is fixed at the corner where the first pipe body 11 and the second pipe body 12 are connected together, and is right opposite to the reflection mirror 30.

In one of the embodiments, there is a through hole provided at an intersection of the first pipe body 11 and the second pipe body 12, The light-emitting end of the light source 20 is installed inside the through hole and faces the reflecting surface of the reflection mirror 30, The light source 20 and the reflection mirror 30 are both disposed at the intersection of the first pipe body 11 and the second pipe body 12 to ensure that most of the light is reflected and then emitted toward the air outlet end, and to, on the other hand, make the air pipe joint 4 having a smaller length and height and more space-saving. Moreover, the end of the light source 20 is completely embedded inside the air pipe joint 4 to prevent a damage to the light source 20 resulted from a high pressure air. The arc surface or the inclined reflecting surface of the reflection mirror 30 also serves as a transition surface for guiding the air to have a natural turning.

Figure 3:
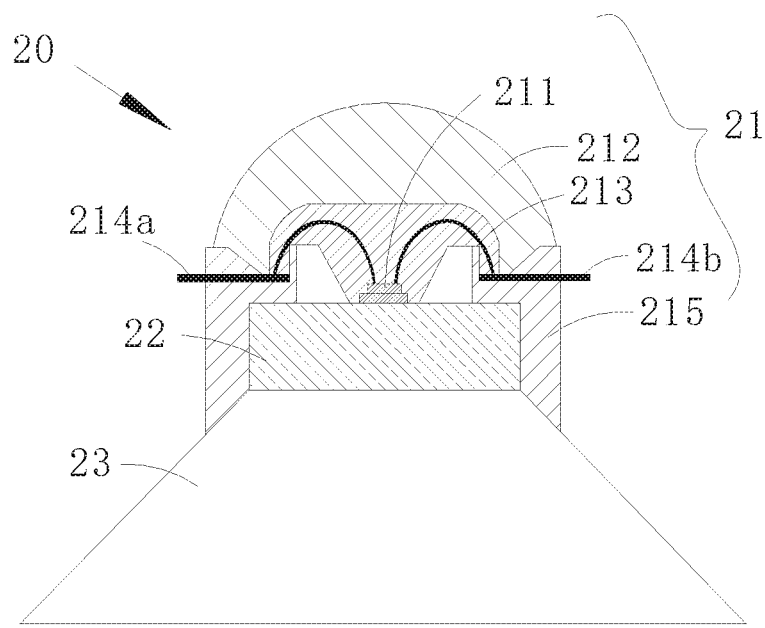
FIG. 3 is a schematic sectional view of a light source according to one embodiment of the present invention.
Figure 4:
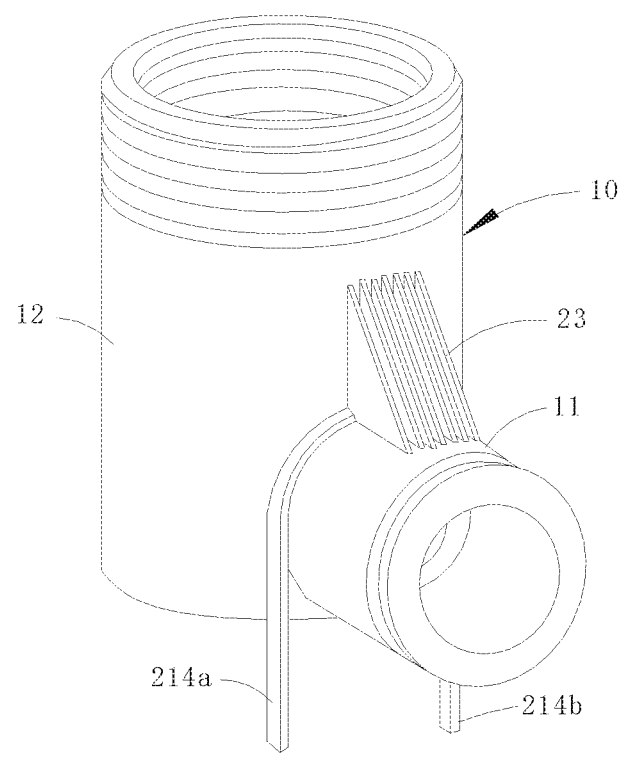
FIG. 4 is a three-dimensional schematic structural diagram of an air pipe joint according to one embodiment of the present invention.

As shown in FIG. 3, the light source 20 includes a lamp bead 21, a heat sink 22, and a plurality of heat-dissipating fins 23. The heat sink 22 is fixed on the tail of the lamp bead 21, The heat-dissipating fin 23 has a trapezoidal sheet structure. The plurality of heat-dissipating fins 23 with a same shape and size are fixed to the end of the heat sink 22 in parallel with each other. As shown in FIG. 4, when the lamp bead 21 is embedded in the through hole of the air pipe joint 4, the heat-dissipating fins 23 extend to the outside of the pipe body 10. Each heat-dissipating fin 23 has two opposite ends abutting against outer wall surfaces of the first pipe body 11 and the second pipe 12, serve as stiffeners for the air pipe joint 4, and also increase the fixing reliability of the light source 20.

The lamp bead 21 includes an LED chip 211, a lens 212, a silica gel 213, an anode lead 214a and a cathode lead 214b respectively connected to the LED chip 211, and a housing 215. The LED chip 211 is fixed on the surface of the heat sink 22. The lens 212 is encapsulated by and inside the housing 215. The lens 212 is packaged on the surface of the housing 215 so as to encapsulate the LED chip 211 therein. The silica gel 213 is filled between the LED chip 211 and the lens 212. The anode lead 214a and the cathode lead 214b are respectively led out from the LED chip 211, through the silica gel 213 and the housing 215, to the outside of the air pipe joint 4. The housing 215 is a hollow structure with an open at its bottom. The heat sink 22 and portion of heat-dissipating fin 23 are surrounded by the housing 215.

At the end of the first pipe body 11 of the air pipe joint 4, i.e., the air inlet end, there is a ring-shaped stopping part 10a convexly provided on the inner surface of the first pipe body 11. A sealing ring 40 is elastically attached to the inner wall of the first pipe body 11, and located between the stopping part 10a and the air inlet end. When an air intake pipe A is inserted into the first pipe body 11 and connected to the first pipe body 11, the sealing ring 40 is compressed between and by the first pipe body 11 and the air intake pipe A, resulting of a very good seal. In order to improve a connecting convenience of the first pipe body 11 and the air intake pipe A, the first pipe body 11 is fixed with a circle of elastic reeds 50 near the inner surface of the air inlet end. When the air intake pipe A is inserted, the elastic reed 50 and the air intake pipe A flexibly snap-in, which can limit the position of the air intake pipe A and prevent it from loosening or escaping from the first pipe body 11.

Specifically, the elastic spring 50 includes a fixing portion 51 for being fixed on a pipe wall near the end of the first pipe body 11, and an elastic abutting portion 52 for being fixed to an end of the fixing portion 51 that is away from the end of the first pipe body 11. A raised portion 52a at the end of the elastic abutting portion 52 is tilted toward a direction away from the pipe wall and the end of the first pipe body 11 with respect to the fixed portion 51. The end of the fixed portion 51 is curled toward the middle of the first pipe body 11 to form a curled portion 51a, A buffer portion 53 may also be connected between the fixed portion 51 and the elastic abutting portion 52. The buffer portion 53 may be an elastic structure formed by curling an elastic sheet many times, and elastically urged the fixed portion 51 and the elastic abutting portion 52 respectively in two opposite directions perpendicular to the axis of the first pipe 11. When the surface of the air intake pipe A is sleeved with a cylindrical quick joint C, the quick joint C and the air intake pipe A are interference fitted, and a barb C1 protruding on the outer surface of the quick joint C successively pushes the curling portion 51a and the buffer portion 53 out, so that the air intake pipe A elastically abuts against the raised portion 52a and the seal ring 40, Both the raised portion 52a and the buffer portion 53 can act as a catching on the air intake pipe A, and the curling portion 51a can play a role of limiting the escape of the air intake pipe A.

Since the air pipe joint of the present invention has a light source inside, it can emit light from the air outlet end thereof, thereby reducing the blind spot on the transparent stage and reducing the influence of the air pipe joint itself on the measurement accuracy. Since the end of the second pipe body has the structure of quick coupling with the air intake pipe, it can ensure that the air pipe joint of the present invention has a high disassembling efficiency and reliable air tightness.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. An air pipe joint for inspecting a substrate on a stage, including a hollow pipe body, a reflection mirror and a light source, wherein the pipe body comprises a first pipe body and a second pipe body which are bent to and communicated with each other, free ends of the first pipe body and the second pipe body are respectively an air inlet end for connecting an air intake pipe and an air outlet end for discharging air, the light source is fixed inside the pipe body, the light emitted by the light source is emitted from the air outlet end, and the reflection mirror is disposed in the pipe body for reflecting the light emitted from the light source toward the air outlet end, wherein the first pipe body and the second pipe body are perpendicular to each other, the first pipe body is attached to a lower surface of the stage, a tip of the air outlet end of the second pipe is at a plane same to an upper surface of the stage, and wherein the reflection mirror is disposed at a corner portion where the first pipe body and the second pipe body are connected and has a reflecting surface, the light source is disposed at an opposite corner portion where the first pipe body and the second pipe body are connected, and the light source is right opposite to the reflection mirror and faces the reflecting surface.

2. The air pipe joint for inspecting a substrate on a stage as claimed in claim 1, wherein the light source is an LED light source.

3. The air pipe joint for inspecting a substrate on a stage as claimed in claim 2, wherein the reflecting surface faces both the air inlet end and the air outlet end, a through hole is formed at an intersection of the first pipe body and the second pipe body, a light emitting end of the light source is embedded in the through hole, the light source includes a lamp bead, a heat sink, and a plurality of heat-dissipating fins, the heat sink is fixed on the tail of the lamp bead, the heat-dissipating fins are disposed at the end of the heat sink with interval, the lamp bead is embedded in the through hole, and the heat-dissipating fins extend to outside of the pipe body.

4. The air pipe joint for inspecting a substrate on a stage as claimed in claim 3, further including a sealing ring, and a circle of stopping part provided on an inner surface of the first pipe body, wherein the sealing ring elastically abuts on an inner wall of the first pipe body, and is located between the stopping part and the air inlet end.

5. The air pipe joint for inspecting a substrate on a stage as claimed in claim 3, further including a circle of elastic reed for making elastic contact with the air inlet pipe, wherein the elastic reed is fixed on the inner surface of the first pipe body and approaches the air inlet end.

6. The air pipe joint for inspecting a substrate on a stage as claimed in claim 1, wherein the reflecting surface being a concave arc surface or an inclined plane.

7. The air pipe joint for inspecting a substrate on a stage as claimed in claim 1, wherein the reflecting surface facing faces both the air inlet end and the air outlet end.

8. The air pipe joint for inspecting a substrate on a stage as claimed in claim 7, wherein a through hole is formed at an intersection of the first pipe body and the second pipe body, a light emitting end of the light source is embedded in the through hole.

9. The air pipe joint for inspecting a substrate on a stage as claimed in claim 8, wherein the light source includes a lamp bead, a heat sink, and a plurality of heat-dissipating fins, and wherein the heat sink is fixed on the tail of the lamp bead, the heat-dissipating fins are disposed at the end of the heat sink with interval, the lamp bead is embedded in the through hole, and the heat-dissipating fins extend to outside of the pipe body.

10. The air pipe joint for inspecting a substrate on a stage as claimed in claim 7, further including a sealing ring, and a circle of stopping part provided on an inner surface of the first pipe body, wherein the sealing ring elastically abuts on an inner wall of the first pipe body, and is located between the stopping part and the air inlet end.

11. The air pipe joint for inspecting a substrate on a stage as claimed in claim 7, further including a circle of elastic reed for making elastic contact with the air inlet pipe, wherein the elastic reed is fixed on the inner surface of the first pipe body and approaches the air inlet end.

12. A measurement system for substrate inspection, comprising stage for supporting a substrate, an illuminating light source disposed under the stage, a measuring device disposed above the stage and being opposite to the illuminating light source so as generate a measured image, and an air pipe joint for substrate inspection, wherein the air pipe joint for inspecting a substrate includes a hollow pipe body, a reflection mirror and a light source, the pipe body comprises a first pipe body and a second pipe body which are bent to and communicated with each other, free ends of the first pipe body and the second pipe body are respectively an air inlet end for connecting an air intake pipe and an air outlet end for discharging air, the light source is fixed inside the pipe body, the light emitted by the light source is emitted from the air outlet end, the reflection mirror is disposed in the pipe body for reflecting the light emitted from the light source toward the air outlet end, the second pipe body penetrates into the bottom of the stage and fixed in the stage, and the air outlet end faces the measuring device, wherein the first pipe body and the second pipe body are perpendicular to each other, the first pipe body is attached to a lower surface of the stage, a tip of the air outlet end of the second pipe is at a plane same to an upper surface of the stage, and wherein the reflection mirror is disposed at a corner portion where the first pipe body and the second pipe body are connected and has a reflecting surface, the light source is disposed at an opposite corner portion where the first pipe body and the second pipe body are connected, and the light source is right opposite to the reflection mirror and faces the reflecting surface.

13. The measurement system for substrate inspection as claimed in claim 12, wherein the light source is an LED light source.

14. The measurement system for substrate inspection as claimed in claim 12, wherein the reflecting surface being a concave arc surface or an inclined plane.

15. The measurement system for substrate inspection as claimed in claim 12, wherein the reflecting surface facing both the air inlet end and the air outlet end, and wherein the light source is right opposite to the reflection mirror.

16. The measurement system for substrate inspection as claimed in claim 15, wherein a through hole is formed at an intersection of the first pipe body and the second pipe body, a light emitting end of the light source is embedded in the through hole.

17. The measurement system for substrate inspection as claimed in claim 16, wherein the light source includes a lamp bead, a heat sink, and a plurality of heat-dissipating fins, and wherein the heat sink is fixed on the tail of the lamp bead, the heat-dissipating fins are disposed at the end of the heat sink with interval, the lamp bead is embedded in the through hole, and the heat-dissipating fins extend to outside of the pipe body.

18. The measurement system for substrate inspection as claimed in claim 15, wherein the air pipe joint further includes a sealing ring, a circle of elastic reed for making elastic contact with the air inlet pipe, and a circle of stopping part provided on an inner surface of the first pipe body, wherein the sealing ring elastically abuts on an inner wall of the first pipe body and is located between the stopping part and the air inlet end, and the elastic reed is fixed on the inner surface of the first pipe body and approaches the air inlet end.

\* \* \* \* \*